Patented Sept. 18, 1951

2,568,018

UNITED STATES PATENT OFFICE 2,568,018

TREATMENT OF PARAFORMALDEHYDE

Alexander F. MacLean, Robstown, and Walter E. Heinz, Corpus Christi, Tex., assignors to Celanese Corporation of America, New York, N. Y., a corporation of Delaware No Drawing. Application October 28, 1949, Serial No. 124,238

17 Claims. (Cl. 260—340)

This invention relates to the treatment of paraformaldehyde and relates more particularly to the treatment of paraformaldehyde in particle form whereby the water content thereof may be substantially reduced.

An object of this invention is the provision of an improved process for the treatment of paraformaldehyde in particle form whereby paraformaldehyde of a relatively low water content may be obtained.

Another object of this invention is to provide a continuous process for the drying or dehydration of paraformaldehyde wherein the degree of polymerization and formaldehyde content of the paraformaldehyde are increased during the drying treatment while the water content is simultaneously decreased.

Other objects of this invention will appear from the following detailed description.

Paraformaldehyde is a solid or semi-solid mixture of formaldehyde polymers. Paraformaldehyde does not possess a fixed composition but normally comprises a mixture of polymers of different degrees of polymerization. The term "paraformaldehyde" is used herein to designate a solid mixture of such polymers with water containing 80% by weight or more of formaldehyde. Since depolymerization takes place when paraformaldehyde is added to water, it is a very useful form of formaldehyde, being capable of being dissolved in water to yield aqueous formaldehyde solutions of any desired concentration. Furthermore, at its normal pH of about 3.4 paraformaldehyde is a relatively stable material and may be readily stored, shipped or otherwise handled. The pH of the paraformaldehyde is measured by dissolving the paraformaldehyde in water to form a 40% by volume aqueous formaldehyde solution and determining the pH of the solution. Since the transportation of water is an obviously uneconomical procedure, a very low water content in paraformaldehyde is usually quite desirable. For some processes wherein it is necessary to employ gaseous formaldehyde free of water, the use of susbtantially anhydrous paraformaldehyde is essential. Paraformaldehyde, in the form of chips, flakes or powder, may be dried and the water content substantially reduced by employing heated air of low moisture content as the drying medium. However, drying under these conditions is relatively slow, and it is impractical to obtain paraformaldehyde of less than 3.0 to 4.0% moisture content. On further drying sublimation takes place or, if the temperature is raised unduly, the paraformaldehyde melts.

We have now found that the rate of drying of paraformaldehyde in particle form may be greatly accelerated if vapors of an alkaline or acid material are incorporated in the paraformaldehyde particles being dried so as to increase or decrease the pH thereof above or below the normal pH of about 3.4 and the modified paraformaldehyde particles are then subjected to drying conditions. When the pH has been modified as indicated, the increase in temperature resulting from the absorption of sensible heat from the heated air employed for drying results in further polymerization of the paraformaldehyde being dried. The higher degree of polymerization of the paraformaldehyde thus achieved permits the water content of the same to be reduced far more rapidly than when drying is effected with the paraformaldehyde at its normal pH of about 3.4.

As examples of alkaline or acid materials which may be employed to vary the pH of the paraformaldehyde particles, there may be mentioned organic materials such as triethylamine, N-methyl pyrrolidine or other tertiary amines which do not react with formaldehyde and inorganic materials such as hydrogen chloride. Preferably, the alkaline or acid material is incorporated in an air stream which is passed over the paraformaldehyde particles and the latter is then subjected to the desired drying conditions. However, the air stream containing the alkaline or acid material may also be employed to effect the entire drying operation, the alkaline or acid content being suitably adjusted to yield the desired change in pH of the paraformaldehyde particles during the drying step. Our novel process may be carried out in a continuous manner by adjusting the pH of the paraformaldehyde particles, employing a treating system and then passing the treated particles into a suitable dryer through which is forced heated air at the desired temperature and containing the desired moisture content.

Thus, in drying paraformaldehyde in accordance with our novel process, paraformaldehyde particles of 4 to 200 mesh particle size may be exposed to a stream of air at a temperature of 25 to 50° C. containing 0.1 to 10% by volume of hydrogen chloride or triethylamine, for example, for 1 to 30 minutes so as to modify the pH of the paraformaldehyde particles due to absorption of the alkaline or acid material from the air stream. The treated paraformaldehyde particles may then be given a preliminary drying treatment by heating at about 100° C. Following this preliminary drying treatment, if employed, the paraformaldehyde particles are then preferably ground to between 50 and 100 mesh particle size and the ground particles then dried with the heated air employing a suitable drying apparatus. Air heated to a temperature of 80 to 170° C. and containing 0 to 10 or even 25% by volume of water vapor may be employed. Advantageously, an air rate of about 1 to 100 volumes of air per minute per volume of paraformaldehyde undergoing treatment may be employed. The paraformaldehyde volume is measured, of course, when the latter is in the form of a static bed.

Drying may be effected employing a rotating tunnel dryer provided with axial ribs so that the paraformaldehyde particles are lifted and dropped into the air stream passing through the tunnel dryer countercurrent to the direction of movement of the paraformaldehyde particles. Drying may also be effected with the paraformaldehyde particles in the form of a fluidized bed, fluidization being effected by the motion of the heated air stream passing upwardly through the paraformaldehyde particles. The velocity of the air stream is adjusted so that a portion of the paraformaldehyde particles is continuously carried upward and into a cyclone separator wherein the dried particles are separated from the moving air stream. To maintain a uniform quantity of paraformaldehyde in the dryer, paraformaldehyde particles to be dried are continuously introduced together with the entering air stream and at a rate substantially equal to the rate at which the dried particles are removed in the air stream leaving the dryer and entering the cyclone separator. Dried paraformaldehyde particles containing as little as 0.5 to 1.5% by weight moisture may be obtained by our novel process with a total elapsed drying time of from about 1 to 4 hours. When drying paraformaldehyde at its normal pH of about 3.4 employing air at the same temperature and containing the same moisture content, a drying time upward of 24 hours is necessary in order to reduce the moisture content of the paraformaldehyde particles to about 3%, and with the resultant loss of much formaldehyde in the vapor.

In order further to illustrate our invention, but without being limited thereto, the following examples are given:

Example I

Extruded paraformaldehyde particles in the shape of cylinders having a diameter of about 0.20 inch and an average length of about 0.50 inch containing 90.4% of formaldehyde and 9.6% by weight of water are exposed to an air stream containing about 5% by volume of hydrogen chloride for 3 minutes. The particles are then dried for about 2 hours at a temperature of 100° C. in a steam heated dryer open to the air. The cylindrical particles are then ground to 50-100 mesh particle size and dried in the form of a fluidized bed in a vertical cylindrical dryer employing air at a temperature of 130° C. and containing 7% by weight of moisture. After an average period of about 2 hours in the vertical dryer employing about 5 volumes per minute of air per volume of the paraformaldehyde particles, the dried paraformaldehyde particles which are separated in the cyclone separator are found to contain but 2% by weight of moisture. Ordinary drying of this paraformaldehyde without any treatment to modify the pH and employing heated air at the same temperature and having the same moisture content does not give paraform of this degree of dryness. The paraform melts or sublimes without the desired reduction in moisture content.

Example II

Extruded paraformaldehyde particles in the shape of cylinders having a diameter of about 0.20 inch and an average length of about 0.50 inch containing 90.4% of formaldehyde and 9.6% by weight of water are exposed to an air stream containing about 3% by volume of triethylamine for about 30 minutes. The treated particles are then subjected to a preliminary drying for 2 hours at a temperature of 100° C. in a steam heated dryer open to the air. The partially dried particles are then ground to pass a 50-100 mesh screen and dried as a fluidized bed in a vertical cylindrical dryer employing air heated to 160° C. and containing 5% by weight of moisture. About 5 volumes of air per minute per volume of paraformaldehyde particles are employed to effect the drying. After an average drying period of 1 to 2 hours in said dryer, the dried paraformaldehyde particles are found to contain but 0.5% by weight of water. Drying in the ordinary manner without the treatment whereby the pH is varied causes the paraform to melt.

It is to be understood that the foregoing detailed description is given merely by way of illustration and that many variations may be made therein without departing from the spirit of our invention.

Having described our invention, what we desire to secure by Letters Patent is:

1. Process for the drying of paraformaldehyde, which comprises treating paraformaldehyde with a current of air containing an added material selected from the group consisting of alkaline reacting materials and acid reacting materials in an amount sufficient to alter the pH of the paraformaldehyde, and then drying the paraformaldehyde so modified.

2. Process for the drying of paraformaldehyde, which comprises treating paraformaldehyde in particle form with a current of air containing about 5% by volume of hydrogen chloride for about 3 minutes, subjecting the particles to drying at 100° C. for 1 to 2 hours, reducing the particle size of the paraformaldehyde particles to pass 50-100 mesh and then drying the finely-divided particles to a moisture content of 2% by weight with a current of air at a temperature of about 130° C. and containing about 7% by weight of moisture.

3. Process for the drying of paraformaldehyde, which comprises treating paraformaldehyde in particle form with a current of air containing about 3% by volume of triethylamine for about 30 minutes, subjecting the particles to drying at 100° C. for 1 to 2 hours, reducing the particle size of the paraformaldehyde particles to pass 50-100 mesh and then drying the finely-divided particles to a moisture content of 0.5% by weight with a current of air at a temperature of about 160° C. and containing about 5% by weight of moisture.

4. Process for the drying of paraformaldehyde, which comprises treating paraformaldehyde with a current of air containing an added material selected from the group consisting of alkaline reacting materials and acid reacting materials in an amount sufficient to alter the pH of the paraformaldehyde, and then drying the paraformaldehyde so modified, employing a current of heated air as the drying medium.

5. Process for the drying of paraformaldehyde, which comprises treating paraformaldehyde with a current of air containing an added material selected from the group consisting of alkaline reacting materials and acid reacting materials in an amount sufficient to alter the pH of the paraformaldehyde, and then drying the paraformaldehyde so modified, employing a current of heated air at a temperature of 80 to 170° C. as the drying medium.

6. Process for the drying of paraformaldehyde, which comprises treating paraformaldehyde with a current of air containing an added material selected from the group consisting of alkaline reacting materials and acid reacting materials in an amount sufficient to alter the pH of the paraformaldehyde, and then drying the paraformaldehyde so modified, employing a current of heated air at a temperature of 80 to 170° C. containing from 0 to 10% by weight of moisture as the drying medium.

7. Process for the drying of paraformaldehyde having a pH of about 3.4, which comprises treating paraformaldehyde with a current of air containing an added material selected from the group consisting of alkaline reacting materials and acid reacting materials in an amount sufficient to alter the pH of the paraformaldehyde, and then drying the paraformaldehyde so modified.

8. Process for the drying of paraformaldehyde having a pH of about 3.4, which comprises treating paraformaldehyde with a current of air containing an added material selected from the group consisting of alkaline reacting materials and acid reacting materials in an amount sufficient to alter the pH of the paraformaldehyde, and then drying the paraformaldehyde so modified, employing a current of heated air as the drying medium.

9. Process for the drying of paraformaldehyde, which comprises treating paraformaldehyde with a current of air containing a tertiary amine in an amount sufficient to alter the pH of the paraformaldehyde, and then drying the paraformaldehyde so modified.

10. Process for the drying of paraformaldehyde, which comprises treating paraformaldehyde with a current of air containing triethylamine in an amount sufficient to alter the pH of the paraformaldehyde, and then drying the paraformaldehyde so modified.

11. Process for the drying of paraformaldehyde, which comprises treating paraformaldehyde with a current of air containing hydrogen chloride in an amount sufficient to alter the pH of the paraformaldehyde, and then drying the paraformaldehyde so modified.

12. Process for the drying of paraformaldehyde, which comprises treating paraformaldehyde having a pH of about 3.4 with a current of air containing triethylamine in an amount sufficient to alter the pH of the paraformaldehyde, and then drying the paraformaldehyde so modified, employing a current of heated air as the drying medium.

13. Process for the drying of paraformaldehyde, which comprises treating paraformaldehyde having a pH of about 3.4 with a current of air containing hydrogen chloride in an amount sufficient to alter the pH of the paraformaldehyde, and then drying the paraformaldehyde so modified, employing a current of heated air as the drying medium.

14. Process for the drying of paraformaldehyde, which comprises treating paraformaldehyde with a current of air containing triethylamine in an amount sufficient to alter the pH of the paraformaldehyde, and then drying the paraformaldehyde so modified, employing a current of heated air at a temperature of 80 to 170° C. as the drying medium.

15. Process for the drying of paraformaldehyde, which comprises treating paraformaldehyde with a current of air containing hydrogen chloride in an amount sufficient to alter the pH of the paraformaldehyde, and then drying the paraformaldehyde so modified, employing a current of heated air at a temperature of 80 to 170° C. as the drying medium.

16. Process for the drying of paraformaldehyde, which comprises treating paraformaldehyde in particle form with a current of air containing hydrogen chloride in an amount sufficient to alter the pH of the formaldehyde, drying the particles so treated, reducing the particle size of the paraformaldehyde particles, and then drying the finely-divided particles to a moisture content below 3% by weight with a current of heated air containing moisture.

17. Process for the drying of paraformaldehyde, which comprises treating paraformaldehyde in particle form with a current of air containing triethylamine in an amount sufficient to alter the pH of the paraformaldehyde, drying the particles so treated, reducing the particle size of the paraformaldehyde particles, and then drying the finely-divided particles to a moisture content below 3% by weight with a current of heated air containing moisture.

ALEXANDER F. MacLEAN
WALTER E. HEINZ.

REFERENCES CITED

The following references are of record in the file of this patent:

UNITED STATES PATENTS

| Number | Name | Date |
| --- | --- | --- |
| 1,143,114 | Fuller | June 15, 1915 |
| 2,116,783 | Finkenbeiner | May 10, 1938 |
| 2,492,453 | Yates | Dec. 27, 1949 |

Certificate of Correction

Patent No. 2,568,018 — September 18, 1951

ALEXANDER F. MacLEAN ET AL.

It is hereby certified that error appears in the printed specification of the above numbered patent requiring correction as follows:

Column 6, line 34, for "formaldehyde" read *paraformaldehyde*; and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*